(12) United States Patent
Schiller

(10) Patent No.: US 8,158,929 B2
(45) Date of Patent: Apr. 17, 2012

(54) SPECULAR ARRAY FOR RADIOMETRIC CALIBRATION AND METHOD

(75) Inventor: Stephen J. Schiller, La Mirada, CA (US)

(73) Assignee: Raytheon Company, Waltham, MA (US)

( * ) Notice: Subject to any disclaimer, the term of this patent is extended or adjusted under 35 U.S.C. 154(b) by 203 days.

(21) Appl. No.: 12/538,072

(22) Filed: Aug. 7, 2009

(65) Prior Publication Data
US 2010/0032557 A1 Feb. 11, 2010

Related U.S. Application Data

(63) Continuation of application No. PCT/US2008/052083, filed on Jan. 25, 2008.

(60) Provisional application No. 60/889,220, filed on Feb. 9, 2007.

(51) Int. Cl.
*G01D 18/00* (2006.01)

(52) U.S. Cl. ................................ 250/252.1

(58) Field of Classification Search ............... 250/252.1
See application file for complete search history.

(56) References Cited

U.S. PATENT DOCUMENTS

| | | | |
|---|---|---|---|
| 1,992,233 A * | 2/1935 | Norwood | 396/4 |
| 5,371,358 A | 12/1994 | Chang et al. | |
| 5,835,267 A | 11/1998 | Mason et al. | |
| 7,132,648 B2 | 11/2006 | Ratiff et al. | |

OTHER PUBLICATIONS

Biggar et al. Vicarious radiometric calibration of EO-1 sensors by reference to high-reflectance ground targets, IEEE Transactions on Geoscience and Remote Sensing, vol. 41, No. 6 (Jun. 2003), pp. 1174-1179.*
Intl. Preliminary Report on Patentability dated May 26, 2011 of PCT/US2008/052083 filed Jan. 25, 2008 (5 pages).

* cited by examiner

*Primary Examiner* — David Porta
*Assistant Examiner* — Shun Lee
(74) *Attorney, Agent, or Firm* — Pierce Atwood LLP; Joseph M. Maraia

(57) ABSTRACT

A specular array for radiometric calibration (SPARC) includes a plurality of spherical mirrors disposed upon a uniform background as at least one array of reflective points, at least two points reflecting a different intensity of directly incident sunlight. Each mirror has a radius of curvature and a diameter, the radius of curvature and the diameter providing a field of regard, the collective mirrors providing a collective minimum calibratability field of regard. Based upon the radius of curvature, the transmittance value of the sun to each mirror and from each mirror to a sensor being calibrated, the intensity of calibration light provided to the input aperture of a sensor to be calibrated within the collective minimum calibratability field of regard may be determined and used as a baseline for sensor calibration. An associated method of combined spatial and radiometric calibration is also provided.

37 Claims, 14 Drawing Sheets

SPECULAR ARRAY FOR RADIOMETRIC CALIBRATION AND METHOD

CROSS-REFERENCE TO RELATED APPLICATIONS

This application claims benefit under 35 U.S.C. §120 to International Application Ser. No. PCT/US2008/052083 filed on Jan. 25, 2008 and entitled "Specular Array for Radiometric Calibration and Method". PCT/US2008/052083 claims Paris Convention priority to U.S. Provisional Application 60/889,220 filed Feb. 9, 2007, and entitled "Method and Apparatus for Specular Array Radiometric Calibration". The entire contents of each of these applications are incorporated herein by reference.

BACKGROUND

This disclosure relates generally to the field of in-flight radiometric calibration, and in particular to a ground based specular array for radiometric calibration by providing calibration targets with known intensity, traceable to the solar spectral constant.

Airborne, and space born remote sensing systems for geospatial survey and observation are increasing in use and application. Such systems may be employed to detect anthropogenetic and natural effects in climate change, geologic morphology and chemistry, hydrology, vegetation health, as well as to identify and distinguish between friend and foe military targets, drug operations, terrorist activities, damage assessment, and emergency routes for responding to natural disasters.

Achieving these capabilities demand quantitative links be established between the image data and the physical properties and processes the sensor is trying to observe. That is, ideally the sensor should be capable of performing as an absolute calibrated radiometer. Thus, system providers strive to provide adequate methods for addressing stability and accuracy requirements imposed by the user community to define and validate sensor radiometric performance and in turn establish the level of confidence achieved in data exploitation.

Development of monochromatic and multispectral sensing systems continue to move toward increasing spatial resolution in response to the fact that most targets of interest are contained in only a few pixels or even subpixel. Generally, each image is composed of a plurality of pixels, with the sensed reflectivity of light from each pixel analyzed to determine the physical content and make up of the target contained in a pixel area. However, for small targets, the blur spot; due to optical diffraction, electronic readout, sensor motion, atmospheric scattering and/or combinations thereof as well as other potential issues, smears light into nearby pixels spatially disconnected from the target. Indeed, multispectral and hyperspectral sensors collect image data across dozens if not hundreds of spectral bands in which the blurring effect varies because it is wavelength dependent. As a result, knowledge of the spatial performance (i.e. sensor point spread function) must be applied as part of the radiometric calibration process if effective small target radiometry will be achieved If done, analysis of the contiguous spectrum will permit finer spatial resolution and improved radiometric perception of information contained in the image then is otherwise apparent if one ignores the effects of sensor blurring on small targets.

A critical element in the operation of airborne and space borne imaging systems is sensor calibration on the ground before launch or flight. However, it is entirely possible that physical conditions within the imaging system or in the atmosphere between the imaging system and the desired target may change from the calibration laboratory setting in such a way so as to skew the calibration values. The calibration performance thus becomes suspect until validated after deployment. Indeed, to assure the most accurate operation and sensing absolute calibration is most desired.

Absolute calibration is achievable when the sensor system images a calibration source that provides a known radiant flux at the input aperture of the optical system in units of intensity (watts/str), irradiance (watts/m$^2$), or radiance (watts/m$^2$/str). This provides the information needed to establish calibration coefficients converting pixel digital numbers (DN) to at-sensor radiance On-board calibration systems in the solar reflective spectrum have been employed in many instances, however they are generally complex, expensive and taxing on mass limitations if absolute calibration is to be delivered over the life of the mission.

Prior art on-board calibration systems for delivering a known radiant flux in the solar reflective spectrum are known, but succumb to limitations in performance. There are two main categories delivering on-board capabilities: 1) Internal sources and 2) solar diffusers. Internal sources consist of lamps and/or high temperature blackbodies as the calibration reference. Technical shortcomings include inability to match the color temperature of the sun, degradation in radiant output over time, and inability to illuminate (and thus monitor) the entire optical system for contamination and degradation effects.

Solar diffusers have the advantage that they reproduce the spectrum of the sun and can propagate light through the full sensor optical system. However, solar diffusers still suffer from bi-directional reflectance effects and degrade with time. For high spatial resolution systems (requiring large optics) they provide only partial aperture illumination and thus are unable to match the full light path illumination of the focal plane compared to operational targets, creating image artifacts after calibration.

It is also noted that these on-board calibration systems are designed to be extended sources filling a large portion if not all the sensor field-of-view. As a result, blurring effects are averaged out making them ineffective in addressing image quality and spatial issues related to small target radiometric calibration. Further still, an on-board calibration system is capable of calibrating only the immediate system to which it is coupled. Thus, for a sensor constellation there is a potential cost savings through simpler hardware design and reduced laboratory testing, if multiple imaging systems could enjoy use of the same calibration system. In addition, an off-board calibration source supporting inter-sensor calibration, can reveal sensor to sensor bias errors undetectable by an individualized on-board calibrator. This capability is achieved through vicarious calibration methods that image celestial or ground based targets of known radiometric properties.

The Moon and stars have found use in prior art for the calibration of space based systems. The Moon provides an extended source that is limited in access each month and has proven to be problematic in achieving accurate absolute calibration, Stars are more available but typically have spectral properties that are significantly different from the sun and generally support calibration in only the lower end of the sensor operational dynamic range. For airborne systems, neither of these targets is practical for calibration. Thus, they cannot support inter-sensor calibration between airborne and space-based assets.

Current ground based vicarious calibration methods generally involve large surfaces of knowable reflectance, either natural (desert dry lake bed playa or uniform grass fields) or man-made (tarps or diffuse panels). Natural targets have an unstable reflectance with significant bi-directional effects and generally provide only one light flux level for each calibration collect. Man-made diffuse reflectance targets provide better control of reflectance properties and multiple flux levels but, in order to be useful, must still be large, filling many pixels (typically on the scale of twenty to fifty meters or more) They are therefore cumbersome to set out requiring an extensive support team for deployment and maintenance. Both techniques require a broad range of ground truth measurements that characterize target and atmospheric optical properties at the time of the overpass for radiometric calibration.

Hence there is a need for a system and method of radiometric calibration with new capabilities that overcomes one or more of the technical problems noted above.

SUMMARY

This disclosure provides a system and method for radiometric calibration.

In particular, and by way of example only, according to one embodiment a specular array for radiometric calibration, includes: a plurality of spherical mirrors disposed upon a uniform background as at least one array of reflective points, at least two points reflecting a different intensity of directly incident sunlight, each mirror having a radius of curvature and a diameter, the radius of curvature and the diameter providing a field of regard, the collective mirrors providing a collective minimum calibratability field of regard.

In at least one alternative embodiment, provided is a specular array for radiometric calibration, including: a plurality of spherical mirrors disposed upon a uniform background, each mirror having a radius of curvature and a diameter; a first subgroup of mirrors arranged systematically on a cross point grid array, the cross point grid array an order of magnitude larger than a predetermined ground sample pixel resolution, at least one mirror disposed at a cross point of the grid array, the remaining plurality mirrors individually offset at a predetermined location from the cross points of the grid array; and a second subgroup of mirrors structured and arranged as an array of reflective points, at least two points reflecting a different intensity of directly incident sunlight; wherein for each mirror, the radius of curvature and the diameter providing a field of regard, the collective mirrors providing a collective minimum calibratability field of regard.

In yet another embodiment, provided is a system for radiometric calibration, including: a specular array structured and arranged to provide a collective minimum calibratability field of regard of direct reflective sunlight, the specular array including; a plurality of spherical mirrors disposed upon a uniform background as at least one array of reflective points, at least two points reflecting a different intensity of directly incident sunlight, each mirror having a radius of curvature, a diameter and a reflectance, the radius of curvature and the diameter providing a field of regard, the collective mirrors providing the collective minimum calibratability field of regard; an atmosphere information gatherer operable to obtain at least one transmittance value of the atmosphere adjacent to the specular array; a sensor locator operable to determine the location of a sensor to be calibrated including the distance H between each mirror and the sensor; and a processor operable to receive the radius of curvature and reflectance for each mirror in the specular array and the transmittance value for an atmospheric path from the sun to a mirror ($T_1$) and from a mirror to the sensor ($T_2$) to be calibrated, the processor operable to determine the intensity ($I_m$) of the reflected directly incident sunlight provided by each mirror at an input aperture of the sensor to be calibrated.

Further, in yet another embodiment, provided is a method for radiometric calibration, including: providing a plurality of spherical mirrors disposed upon a uniform background, each mirror having a radius of curvature and a diameter, the mirrors arranged as; a first subgroup of mirrors arranged systematically on a cross point grid array, the cross point grid array an order of magnitude larger than a predetermined ground sample pixel resolution, at least one mirror disposed at a cross point of the grid array, the remaining plurality mirrors individually offset at a predetermined location from the cross points of the grid array; and a second subgroup of mirrors structured and arranged as an array of reflective points, at least two points reflecting a different intensity of directly incident sunlight; wherein for each mirror, the radius of curvature and the diameter providing a field of regard, the collective mirrors providing a collective minimum calibratability field of regard; placing a sensor to be calibrated within the collective minimum calibratability field of regard; obtaining a transmittance value for an atmospheric path from the sun to a mirror ($T_1$) and from a mirror to the sensor ($T_2$) to be calibrated; determining the intensity ($I_m$) of the reflected directly incident sunlight provided by each mirror to an input aperture of the sensor to be calibrated; receiving and analyzing first reflected sunlight from the first subset of mirrors, the first reflected sunlight providing data revealing blurring and spatial effects of the sensor; receiving and analyzing second reflected sunlight from the second subset of mirrors, the second reflected sunlight compared with the determined intensity to prove data revealing responsivity of the sensor across about all spectral bands and dynamic ranges,

DETAILED DESCRIPTION

Before proceeding with the detailed description, it is to be appreciated that the present teaching is by way of example only, not by limitation. The concepts herein are not limited to use or application with a specific type of specular array for radiometric calibration. Thus, although the instrumentalities described herein are for the convenience of explanation, shown and described with respect to exemplary embodiments, it will be appreciated that the principles herein may be applied equally in other types of radiometric calibration systems and method.

Figure 1:
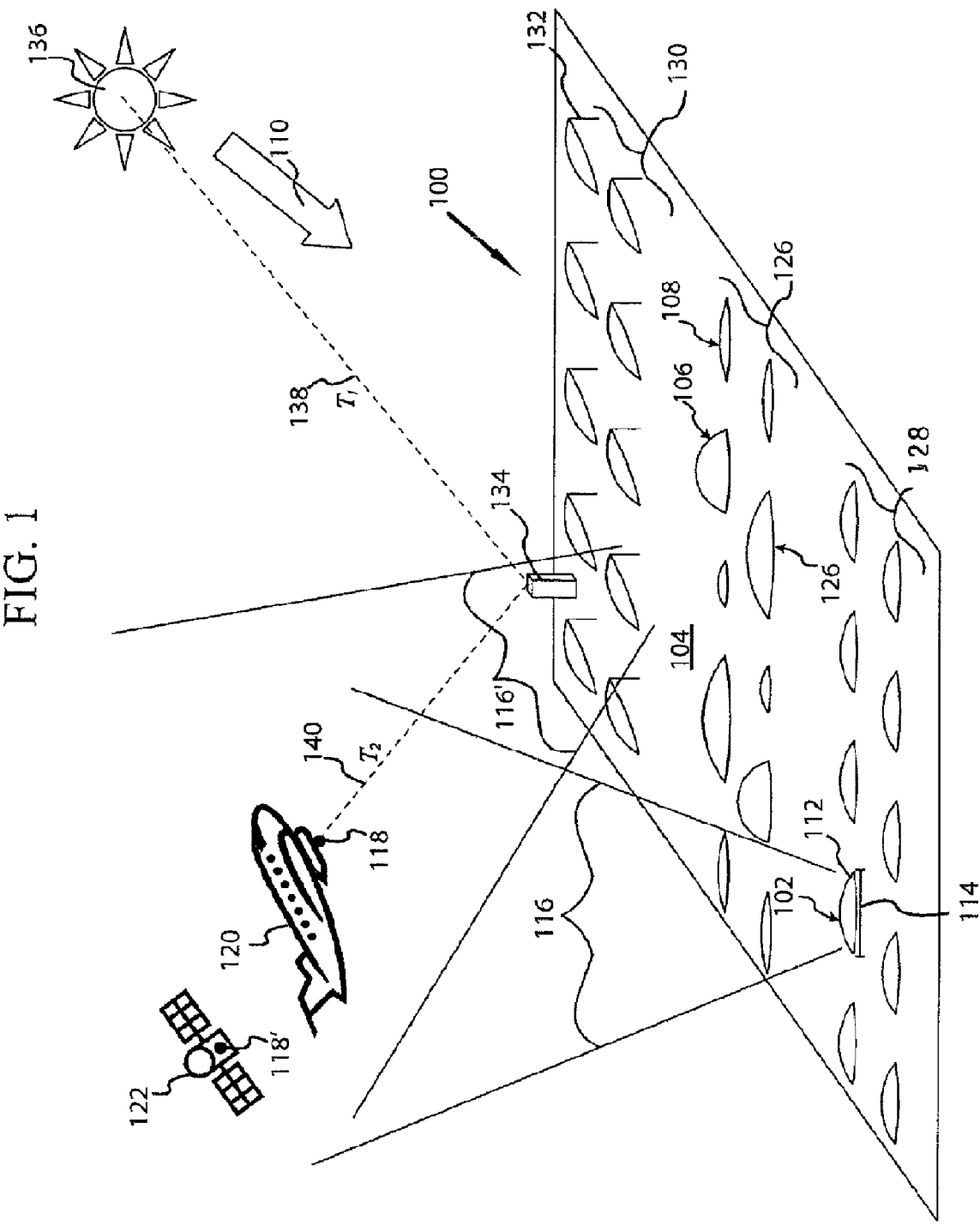
FIG. 1 is a conceptual perspective view of a specular array provided for radiometric calibration in accordance with at least one embodiment.

FIG. 1 conceptually illustrates a perspective view of a specular array for radiometric calibration ("SPARC") 100. The SPARC 100 is comprised of a plurality of spherical mirrors, of which mirror 102 is exemplary, disposed upon a uniform low reflectance background 104 so as to provide an array of reflective points upon the ground. At least two points, e.g., mirrors 106 and 108 reflect different intensity of directly incident sunlight 110 due to a different radius of curvature. In at least one embodiment, the background is an asphalt pavement. In at least one alternative embodiment, the background is a substantially uniform grassy area.

As is further described below and shown in other accompanying figures, each mirror, e.g., mirror 102 has a radius of curvature 112 and a diameter 114. The radius of curvature 112 and the diameter 114 provide a field of regard 116. Collectively, all mirrors of SPARC 100 provide a collective minimum calibratability field of regard When a sensor 118 to be calibrated, for example on board for example an aircraft 120 or sensor 118' on board a satellite 122, is within the minimum calibratability field of regard, calibration can occur using all features of the array.

It should be understood that as is further discussed below, the mirrors of SPARC 100 may have different radius of curvature and diameter dimensions, and as such different individual fields of regard. In at least one embodiment wherein all mirrors are collectively utilized for calibration purposes, it is appreciated that the collective minimum calibratability field of regard is determined by the smallest field of regard produced by a member of the SPARC 100 array Each mirror 102 may be concave or convex, however in at least one embodiment, the mirrors 102 are convex. As domed structures, i.e., rising from the plane of the ground, the convex shape may have certain advantages over concave spherical mirrors, such as but not limited to, a reduced likelihood to collect rain, snow, leaves or other debris that might adversely affect the reflective properties of the mirror 102.

In at least one embodiment, the spherical mirrors are sub-grouped. More specifically, in at least one embodiment there is a first subgroup 124 and a second subgroup 126. In at least one embodiment, the mirrors of the first subgroup 124 are about identical as shown.

Further, as shown in the second subgroup 126, in at least one embodiment at least two mirrors have different radius of curvature, e.g., mirrors 106 and 108. Further, in the second subgroup 126, in at least one embodiment at least two mirrors have different diameters, e.g., mirrors 106 and 128. Generally, the mirrors of SPARC 100 each provide a point source target, as recorded by the sensor, which is collectively an array of reflective points. More specifically, in at least one embodiment and as discussed below, the mirrors of mirrors 102 of the first subgroup 124 provide for calibration of spatial phasing and the mirrors of the second subgroup 126 provide point sources of varying intensity to fully calibrate the dynamic range of the sensor.

It is also appreciated that in at least one embodiment, SPARC 100 is structure and arranged to orient the field of regard 116' and therefore the collective minimum calibratability field of regard towards a sensor 118 be calibrated This is shown in FIG. 1 by exemplary subgroup 130. Such orientation is in one embodiment, achieved by raising one side of each mirror, such as by an adjustable or static foot In at least one embodiment each mirror, or as discussed below—each panel of mirrors, is fitted with an actuator 132 structured and arranged to actuate the specular an ay of mirrors and dynamically orient the collective minimum calibratability field of regard towards a sensor 118 to be calibrated.

Further, in at least one embodiment, SPARC 100 includes at least one information gatherer 134 structured and arranged to gather atmospheric information. More specifically, in one embodiment information gatherer 134 is a solar radiometer operable to determine transmittance (T1) of the atmosphere between the mirrors of SPARC 100 and the sun 136—indicated by dotted line 138, and used to calculate the transmittance (T2) of the atmosphere between the mirrors of SPARC 100 and sensor to be calibrated 118—indicated by dotted line 140.

In at least one embodiment, information gatherer 134 also includes a sensor locator structured and arranged to determine the location of the sensor to be calibrated 118 In actuality, in at least one preferred embodiment, the location information regarding the sensor is provided in the metadata that comes from the sensor 118 system itself. Therefore, in at least one embodiment, the element of the information gatherer 134 that determines the location of the sensor 118 is not so much truly determining the location as it is simply reading and interpreting the information provided directly by the sensor 118 itself. In at least one alternative embodiment, a separate sensor locator, such as radar or triangulation, may be employed. Such location and transmittance information is utilized in determining the intensity of the reflected directly incident sunlight as provided to the sensors to be calibrated 118 and 118'.

In SPARC 100, mirrors 102 advantageously provide "solar stars" at the ground site seen as the virtual image of the sun produced by each mirror. The solar irradiance (watts/m2) at the time of incidence is converted to an intensity source (watt/str) that illuminates any surface or sensor input aperture with an irradiance that follows the inverse square law. The intensities for each mirror 102 are constant over all illumination and view angles making them very versatile for multiple sensors, multiple view angles and multiple atmospheric conditions.

If the mirror has a radius of curvature that is precise, a uniform intensity is produced within a solid angle cone with an angular width determined by the diameter of the mirror's reflecting surface and the radius of curvature. As long as the overflying sensor can see the reflection of the sun, the intensity at the aperture irradiance, an effective radiance response can be determined and used for sensor calibration.

Figure 2:
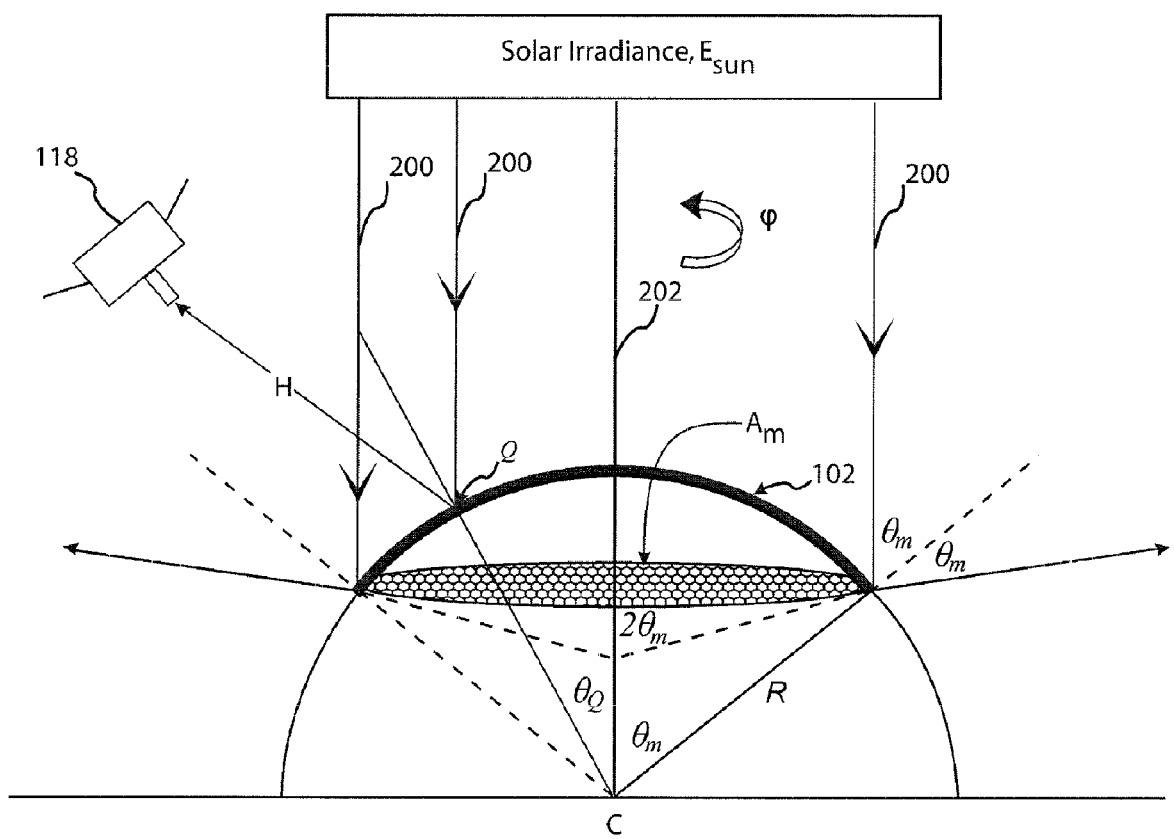
FIG. 2 illustrates an exemplary convex mirror as may be used in FIG. 1 in accordance with at least one embodiment.

Moreover, FIG. 2 depicts an exemplary convex mirror 102 with rays 200 from the sun 136 parallel to the optical axis 202. The mirror 102 is fixed with a radius of curvature R, and an angular width of $2\theta_m$. At an arbitrary angular location on the mirror surface (point Q) the reflected rays from the sun are directed toward a down looking sensor 118 with an angle of incidence and angle of reflection equal to $\theta_Q$ AS long as $\theta_Q < \theta_m$ the sensor 118 will see an image of the sun 136 in the mirror 102. Also a mirror of angular width $2\theta_m$ illuminates an angular width of the sky equal to $4\theta_m$. It is understood and appreciated that when $\theta_m = 45°$ the mirror illuminates a full hemisphere of solid angle of $2\pi$ steradians.

The total energy reflected off the mirror 102 from direct solar illumination is determined by the area of the base of the mirror, $A_m$, and the solar irradiance at the ground, $E_{sun}$. $A_m$ is related to the radius of curvature of the mirror by Equation 1.

$$A_m = \pi(R \sin \theta_m)^2 = (\pi R^2/2)(1 - \cos 2\theta_m) m^2 \text{ using the trig identity } \sin^2 \theta = (1 - \cos 2\theta_m)/2. \quad \text{Equation 1}$$

This energy is reflected into the sky from the virtual image of the sun out to an angle $2\theta_m$ from the optical axis. The energy is therefore spread over the solid angle $\Omega$ given by Equation 2.

$$\Omega_m = \int_0^{2\pi} d\phi \int_0^{2\theta_m} \sin\theta d\theta = 2\pi(1 - \cos 2\theta_m) \quad \text{Equation 2}$$

The total energy reflected will be equal to product of the solar irradiance on the mirror Es, the area of the base of the mirror Am and the specular reflectance r. This energy is reflected into $\Omega m$ steradians of solid angle. Thus, the intensity (watts/str) of the virtual solar image is given by Equation 3.

$$I(\lambda)_m = r(\lambda)E_s(\lambda)A_m / \Omega_m \quad \text{Equation 3}$$

$$= r(\lambda)E_s(\lambda)\left[\frac{\pi R^2}{2}(1 - \cos 2\theta_m)\right]\left[\frac{1}{2\pi(1 - \cos 2\theta_m)}\right]$$

$$= \frac{r(\lambda)E_S(\lambda)R^2}{4} \text{ watts/}str$$

In considering the total flux illuminating the mirror 102, the reflectance of skylight off the mirror may also be considered. The hemisphere of the sky produces an irradiance E^ on the horizontal area An. In at least one embodiment, a reasonable approach to estimating the magnitude of the sky irradiance reflected off the mirror can be achieved by writing the sky contribution as a fraction of the solar irradiance by using the diffuse-to-global ratio, that will be identified by the symbol G. The advantage is that G can be measured directly at the target site using a shadowband radiometer or estimating it with the radiative transfer code based on sunphotometer measurements of atmospheric transmittance. When G is measured, it records the magnitude of the ratio as indicated by Equation 4.

$$G = E_{sky}/(E_s + E_{sky}) \quad \text{Equation 4}$$

It can be shown that this ratio can be written in term of G as in Equation 5.

$$\frac{E_{sky}}{E_s} = \frac{G}{1-G} \quad \text{Equation 5}$$

This equation holds under the assumption that the down-looking sensor 118 "sees" the entire hemisphere of the sky in the mirror 102. Such a situation would result with a nadir looking sensor viewing a mirror with $\theta_m = 45°$ ($\Omega_m = 2\pi$ str) The sky contribution can be made smaller by using a mirror with $\theta_m < 45°$ reducing the portion of the sky seen by the sensor by a factor f. This smaller sky fraction adding to the mirror intensity can be estimated under the assumption that the sky illumination is angularly uniform, so that the sky fraction irradiance, $fE_{sky}$, is independent of sensor view geometry. In this case, the factor f can be written as the ratio of the solid angle for the actual mirror $\theta_m$ (Equation 2) and the hemispherical solid angle $2\pi$ that corresponds to the illumination measured by the diffuse-to-global ratio, as in Equation 6.

$$f = \frac{\Omega_m}{2\pi} = \frac{2\pi(1 - \cos 2\theta_m)}{2\pi} = 1 - \cos 2\theta_m \quad \text{Equation 6}$$

The mirror intensity of the sun+sky virtual image becomes Equation 7.

$$I(\lambda)_m = \frac{r(\lambda)[E_S(\lambda) + fE_{Sky}(\lambda)]R^2}{4} \quad \text{Equation 7}$$

$$= \frac{r(\lambda)E_S(\lambda)\left[1 + \frac{fE_{Sky}(\lambda)}{E_S(\lambda)}\right]R^2}{4} \text{ watts/}str$$

Inserting Equations 5 and 6, the mirror intensity is determined by Equation 8.

$$I(\lambda)_m = \frac{r(\lambda)E_S(\lambda)R^2}{4}\left(1 + \frac{fG(\lambda)}{1 - G(\lambda)}\right) \quad \text{Equation 8}$$

$$= \frac{r(\lambda)E_S(\lambda)R^2}{4}\left(1 + \frac{(1 - \cos 2\theta_m)G(\lambda)}{1 - G(\lambda)}\right) \text{ watts/}str$$

The next step is to propagate the solar spectral constant from the sun 136 to the mirror 102 and then to the overflying sensor 118 to predict a top-of-atmosphere flux. The advantage of using a point source target such as mirror 102 is that it reduces the atmospheric effects that have to be taken into account. Because the flux from sun will reach the focal plane with a known high spatial frequency profile, the low spatial frequency path radiance contribution from scattered light in the atmosphere becomes part of the signal background that is subtracted out. The point spread function is made up of only direct solar flux plus a small contribution from the downwelling sky. In general, the quantity fG/(1−G) will be small or negligible. The result is that the SPARC 100 radiative transfer model may meet accuracy expectations utilizing only atmospheric transmittance.

As indicated above, in at least one embodiment, information gatherer 134 is operable to determine (T1) of the atmosphere between the mirrors of SPARC 100 and the sun 136, and transmittance (J^) of the atmosphere between the mirrors and the sensor, e.g., sensor 118. Accordingly, the total intensity provided to the aperture of sensor 118 is determined by Equation 9.

$$I(\lambda)_m = \frac{r(\lambda)E_o(\lambda)R^2 T_1(\lambda)T_2(\lambda)}{4}\left(1 + \frac{fG(\lambda)}{1 - G(\lambda)}\right) \text{ watts/}str \quad \text{Equation 9}$$

It is to be understood and appreciated that the intensity is independent of value of $\theta_m$. This indicates that the intensity of the solar image is independent of view geometry As long as the full image of the sun 136 is visible in the mirror 102, the intensity directed toward the overhead sensor 118 will be given by Equation 9 no matter the solar illumination or sensor look angle.

The irradiance of the sensor 118 depends on the distance between the mirror image location and the sensor. If the ground to sensor distance is H, as determined in at least one embodiment by information gatherers 134, the distance between the image location and the sensor is H+R/2. R will never be more than a few meters so that H>>R. Thus it may be assumed that H+R/2=H. Since the image is effectively a point source, the power drops according to the inverse square law. Based on energy conservation for a point source illuminating a full sphere, the conversion is $4\pi$ str/$4\pi H^2$ m$^2$=$1/H^2$ str/m$^2$. Thus over the upwelling solid angle directed by the mirror into the hemisphere of the sky the irradiance at the sensor distance H is determined by Equation 10.

$$E_{at\text{-}sensor}(\lambda) = \frac{r(\lambda)E_o(\lambda)R^2 T_1(\lambda)T_2(\lambda)}{4H^2}\left(1 + \frac{fG(\lambda)}{1 - G(\lambda)}\right) \text{watts/m}^2 \quad \text{Equation 10}$$

These computed values are advantageously combined with SPARC 100 to provide an easy to use, ground based calibration system for use by multiple sensors, as the baseline references of provided illumination and irradiance provided to the input aperture of an overflying sensor are independent of the sensor.

In at least one embodiment these equations and the determination of intensity and/or irradiance are derived by a processor that may be an integrated element of the information gatherer 134, or a separate component (not shown) provided adjacent to SPARC 100 for radio communication with the over head sensor undergoing calibration 118, or perhaps the vehicle providing it's platform, e.g., aircraft 120 or satellite 122, or that may be a processor that is a component of or otherwise coupled to the sensor, such that the calculations and values are determined by the sensor or the vehicle supporting the sensor.

Figure 3:
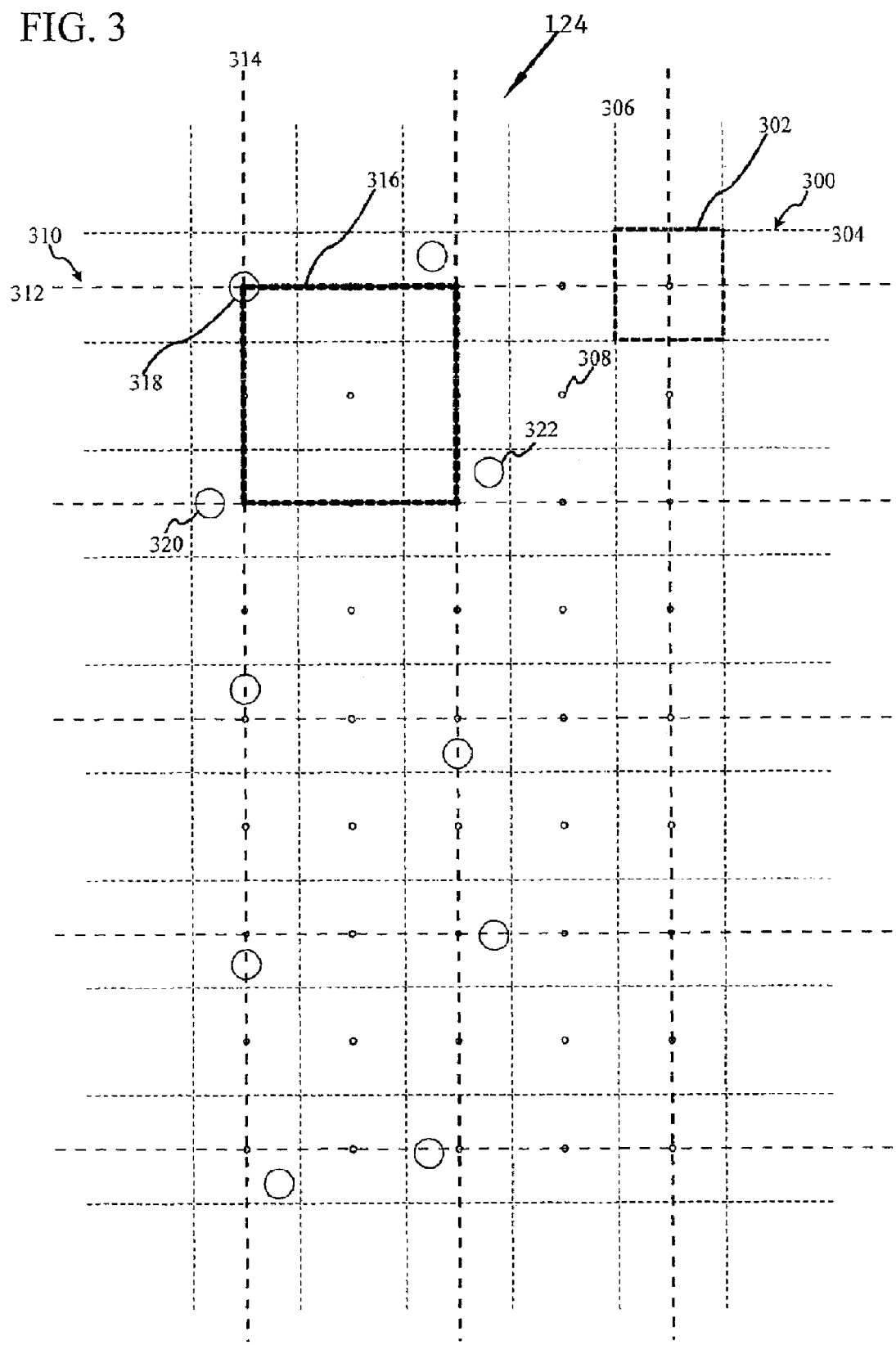
FIG. 3 is a top view conceptually illustrating the first subgroup of mirrors shown in FIG. 1 arranged as an array upon ground pixels in accordance with at least one embodiment.

FIG. 3 is a top view conceptually illustrating a plurality of mirrors 102 providing the first subgroup 124. The ground, or background 104 is perceived by sensors as a grid array 300 of pixels 302 having a predetermined size that define the ground sample pixel resolution As shown the pixels 302 are bounded by light horizontal dotted lines 304 and light vertical dotted lines 306. The center 308 of each pixel 302 is also indicated.

The first subgroup 124 is arranged systematically on a cross point grid array 310, as defined by heavy horizontal dotted lines 312 and heavy vertical dotted lines 314. As shown the cross point grid array 310 is an order of magnitude larger than the predetermined ground sample pixel resolution, as each element 316 of the grid array 310 spans multiple pixels 302.

With respect to the illustrations in FIGS. 3 and 8-13, each element 316 is shown to span across three horizontal pixels 302 and three vertical pixels 302. It is specifically understood that the number of ground pixels may be significantly larger in both the horizontal and vertical directions, but that this illustration of the relationship between cross point grid array 310 and array 300 has been presented for ease of illustration and description In other words although a single empty ground pixel 302 is shown between mirrors (e.g., mirrors 318 and 320 in the vertical direction or mirrors 320 and 322 in the horizontal direction), it is understood and appreciated that an actual deployment of SPARC 100 may include a plurality of empty ground pixels between adjacent mirrors (both horizontally and vertically) Indeed, in at least one embodiment, the number of empty ground pixels 302 between mirrors of the first subgroup 124 is at least six pixels As shown, at least one mirror, e.g., mirror 318 is located at a cross point of the grid array 310. Further, the remaining plurality of mirrors are individually offset at a predetermined location from other cross points of grid array 310. See for example mirror 320 offset to the left, and mirror 322 offset to the upper right.

In at least one embodiment, the plurality of mirrors 102 comprising the first subgroup 124 are substantially identical, such that the intensity of reflected directly incident sunlight is substantially identical for all mirrors. The placement of the each mirror relative to a pixel 302 center 308 advantageously permits characterization and/or isolation of the effects of spatial phasing.

Figure 4:
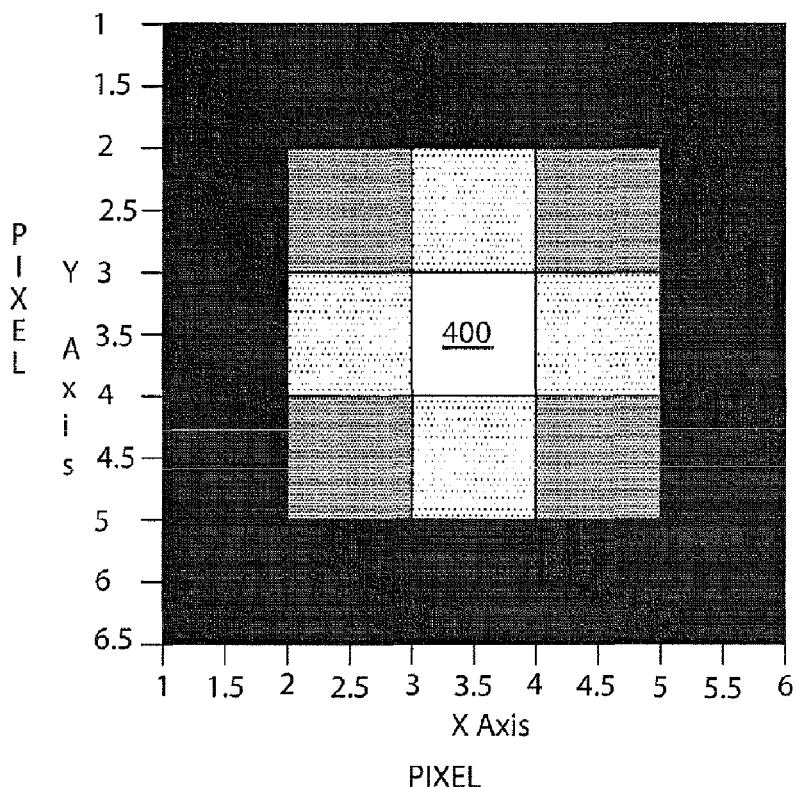
FIG. 4 illustrates an image realized by a sensor imaging a mirror in FIG. 3 in accordance with at least one embodiment.

As discussed above, each mirror in SPARC 100 is effectively a radiometric calibration target, producing a solar star by reflecting the directly incident sunlight FIG. 4 is a representation of a single calibration target mirror centered upon a pixel center (e.g., mirror 318 in FIG. 3) as perceived by a sensor undergoing calibration. As the mirror 318 is aligned to the center of the pixel, the brightest area 400 is centered upon that pixel, with the perceived intensity diminishing symmetrically, as indicated by the hatching and dark shading It is understood and appreciated that FIG. 4 is an ideal representation with the perceived intensity diminishing symmetrically. More commonly for the given area of the image that contains the mirror or mirrors, the intensity pattern will be somewhat nonsymmetrical, though the brightest area will still be easily identifiable.

It is understood and appreciated that the individual mirrors are not resolved in the image provided by the sensor Rather, the target provided by each mirror will fuzz and blur over 4 to 6 adjacent pixels even though the source mirror(s) are smaller than each pixel 302. It is for this reason that the number of empty ground pixels between adjacent mirrors will be greater than as shown in the conceptual illustrations shown in FIGS. 3 and 8-13.

Figure 5:
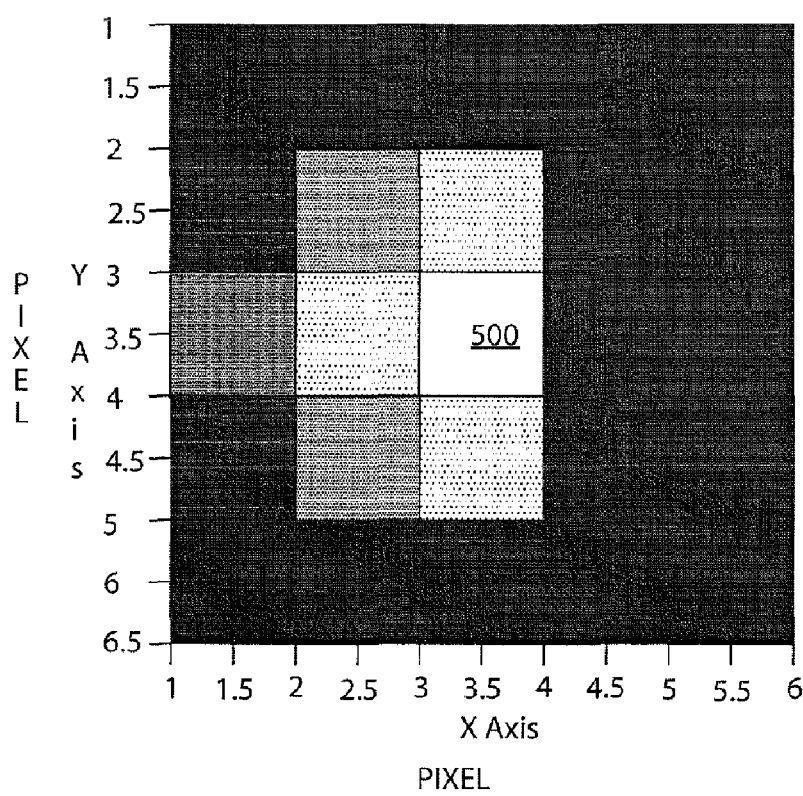
FIG. 5 illustrates a different image realized by a sensor imaging a mirror in FIG. 3 in accordance with at least one embodiment.

FIG. 5, by comparison, is a representation of a single calibration target mirror offset from the pixel center (e.g., mirror 320 in FIG. 3) as perceived by a sensor undergoing calibration. In this case, the brightest area 500 is offset relative to the sampling of the pixels, which is as expected. However, a sensor affected by special phasing may perceive mirror 318 to be as shown in FIG. 5, and/or mirror 320 to be as shown in FIG. 4. FIG. 5 is clearly not as symmetrical as FIG. 4 however horizontal symmetry has been maintained for ease of illustration. It is of course understood and appreciated that the intensity of the pixels surrounding 500 may well be truly non-symmetrical, however, the brightest area 500 is still identifiable and therefore calibration is successful By advantageously placing each mirror 102 at a predetermined location, how each should be perceived is of course known and errors in that perception are easily identified. Moreover, the first subgroup 124 provides images which, when combined produce an over-sampled profile of the sensor and atmospheric two-dimensional point-spread-function. By determining this point-spread further calibration of the sensor is enhanced in accuracy Such determination and calibration is extremely important for sensors used in small target identification.

It is appropriate to also discuss the aspect of the field of regard, which determines the portion of the hemispherical sky that will be illuminated by the mirror. This element is important as it dictates at what view geometries the overflying sensor see solar images produced by the mirrors of SPARC 100. Conversely, it dictates at what orientation SPARC 100 must be aligned to so as to provide view geometries that intersect with the overflying path of a sensor to be calibrated.

Figure 6:
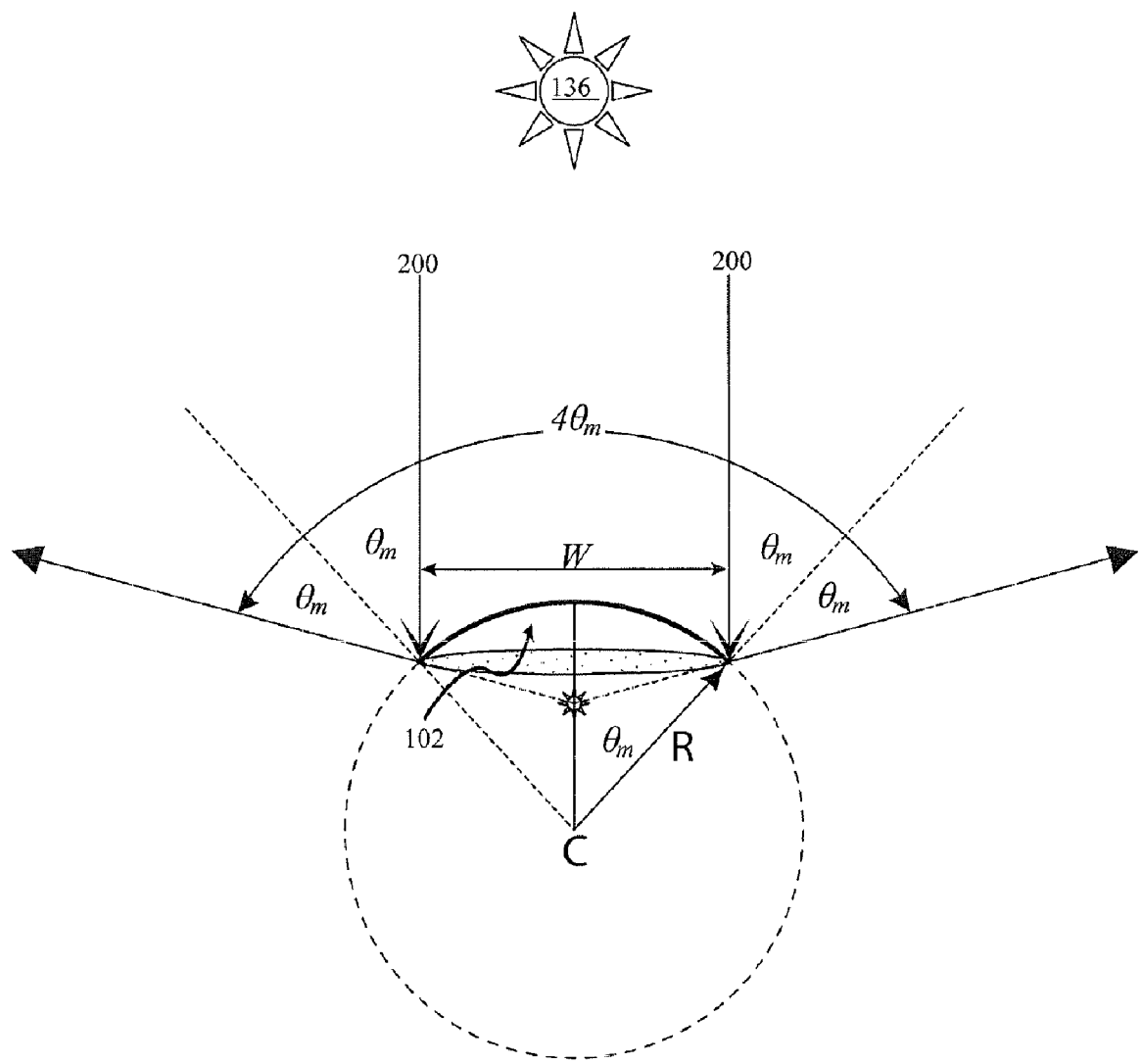
FIG. 6 illustrates an exemplary convex mirror as may be used in FIG. 1, further illustrating the field of regard in accordance with at least one embodiment.

FIG. 6 illustrates the upwelling field of regard for a spherical mirror 102 illuminated by the sun 136. The diameter of the mirror 102 and the radius of curvature determine the field of regard. FIG. 6 further illustrates that, based on the law of reflection, it can be seen and appreciated that the field of regard is 4 times the half angular width of the mirror 102, as indicated by Equation 11.

$$\text{Field of Regard} = 4 \arcsin(W/2R) \quad \text{Equation 11}$$

With respect to FIG. 6, it is readily apparent that the virtual image of the sun 136 projects a uniform intensity over an angular extent of $4\theta m$ or twice the angular diameter of the mirror 102 from the center of curvature, C.

Figure 7:
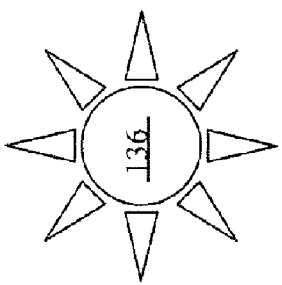
FIG. 7 illustrates three different mirrors having two different fields of regard, and the relative orientations that may be employed in accordance with at least one embodiment.
Figure 7:
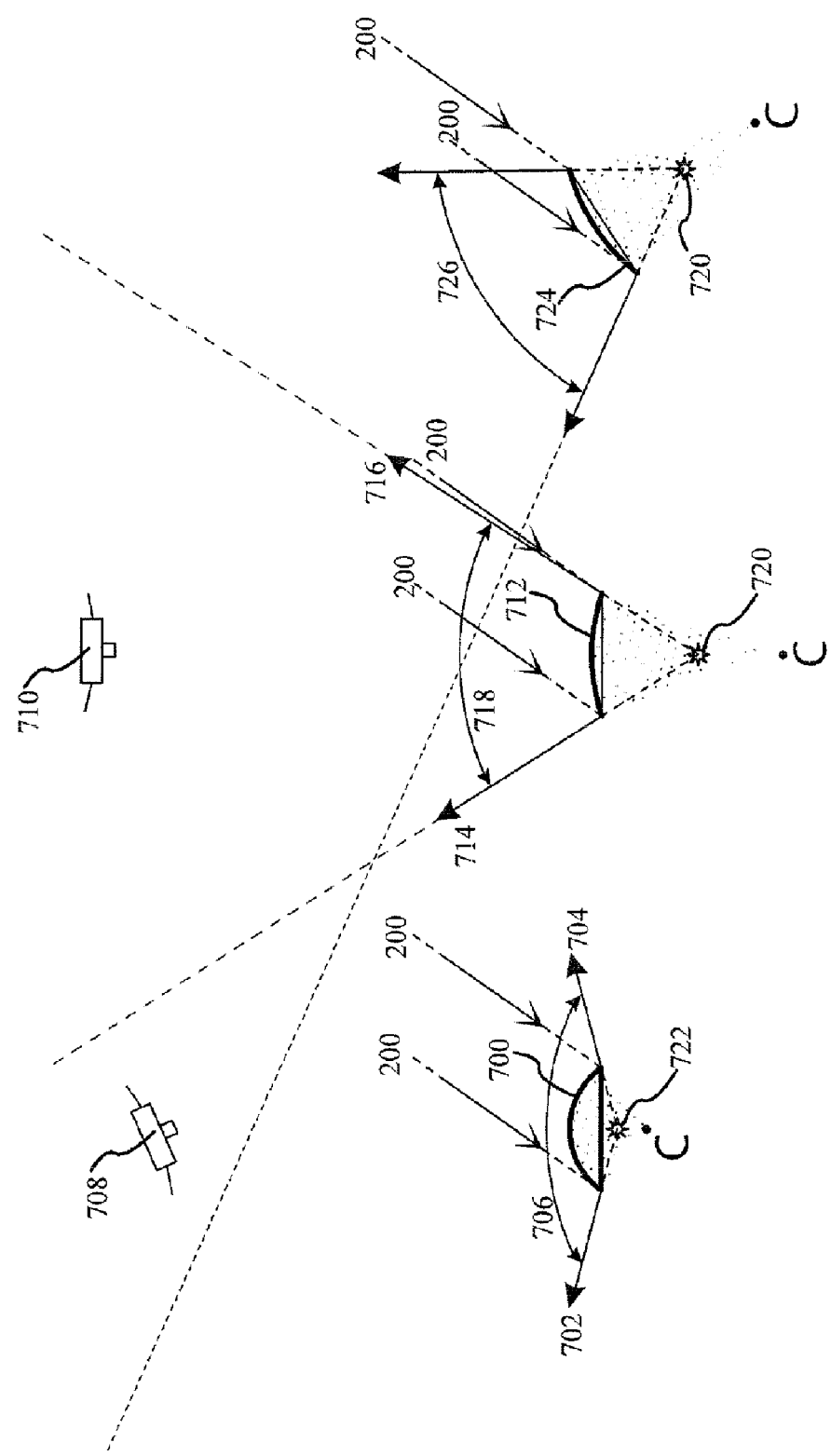

The issue of field of regard as applied to the mirrors 102 of SPARC 100 is further illustrated in FIG. 7. In FIG. 7, a first mirror 700 is shown having a first radius of curvature Arrows 702 and 704 indicate the range of reflected incident sunlight rays 200, e.g., the field of regard 706 provided by mirror 700. Overhead sensors 708 and 710 are each clearly within the range of field of regard 706, though each sensor would potentially require a bit of orientation to properly face mirror 700.

A second mirror 712 is also shown having a second radius of curvature. In this case the arrows 714 and 716 that indicate the field of regard 718 for second mirror 712 are closer together, such that field of regard 712 is sufficient to capture sensor 710, but not sensor 708. This is not unexpected as the image 720 of the sun 136 appears further behind second mirror 712, then does image 722 of sun 136 in first mirror 700.

The configuration of second mirror 712 is not an insurmountable problem, and for limiting sky reflection, technical, manufacturing, storage, or other non-listed reasons it may be desired in certain embodiments to employ mirrors having a larger radius of curvature and a correspondingly smaller field of regard. A third mirror 724 is also shown that is substantially identical to second mirror 712. Indeed the field of regard 726 for the third mirror 724 is geometrically the same as the field of regard 718 for the second mirror 712. However, as shown the third mirror 724 has been oriented such that the field of regard now is aligned to capture both sensor 708 and 710— again, each sensor potentially requiring a bit of orientation to properly address the third mirror 724.

Figure 8:
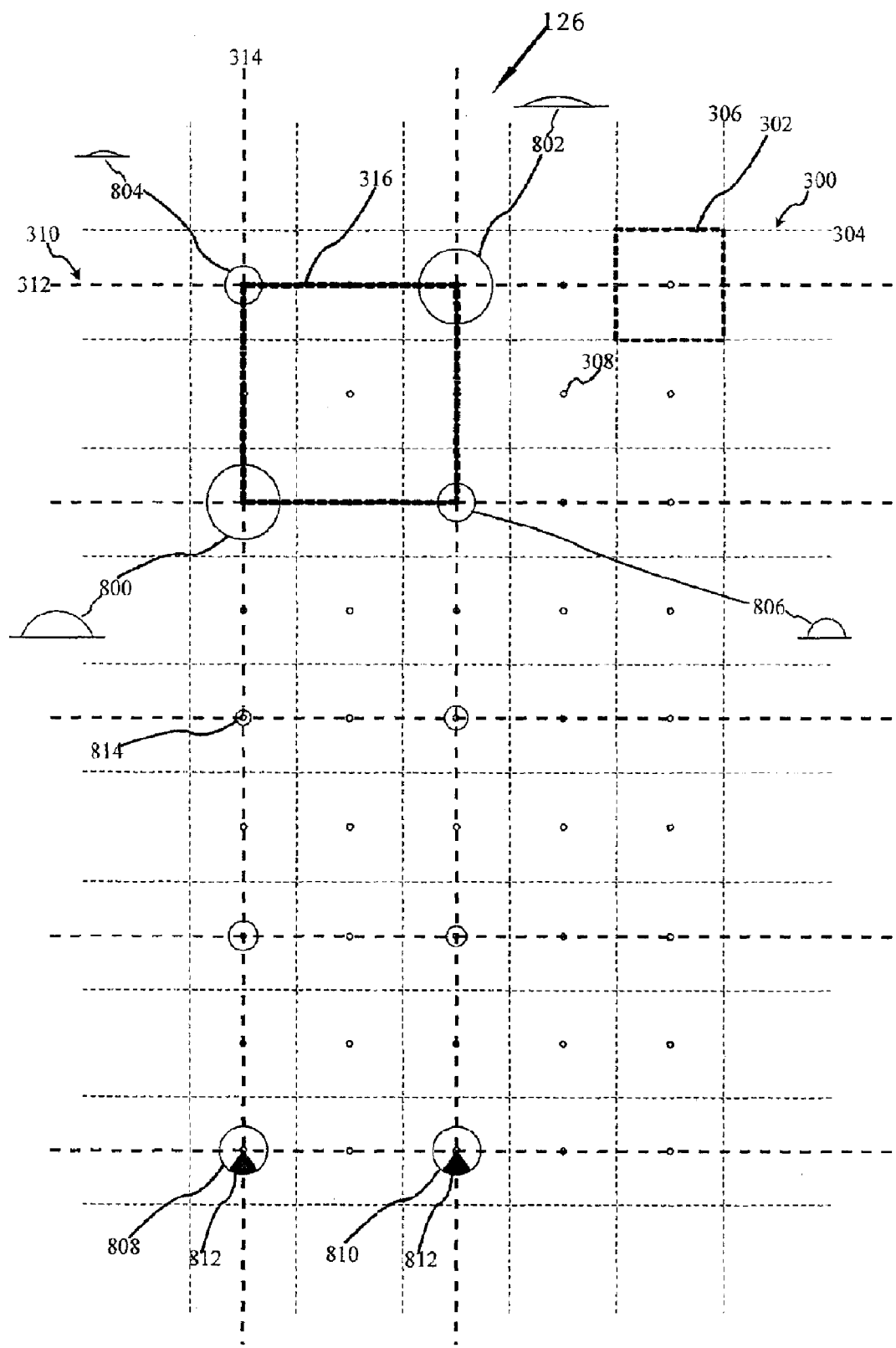
FIG. 8 is a top view conceptually illustrating the second subgroup of mirrors shown in FIG. 1 arranged as an array upon ground pixels in accordance with at least one embodiment.

Returning to the arrangement of the specular array, FIG. 8 is a top view conceptually illustrating a plurality of mirrors 102 providing the second subgroup 126 in accordance with at least one embodiment. For ease of illustration and discussion, the second subgroup 126 is shown to be disposed upon the same cross point grid array 310 as used and explained with respect to the first subgroup of mirrors shown and described in FIG. 4. It is understood and appreciated that the second subgroup 126 may be disposed on a cross point grid of the same or a different scale.

The second subgroup 126 is arranged to provide different levels of point source intensity. As is apparent from the above discussion of the Equations, and specifically Equation 9, the intensity provided by a mirror to the aperture opening of a sensor overflying SPARC 100 is dependent upon the radius of curvature. Diameter and radius of curvature defines the field of regard associated with a specific mirror.

With respect to FIG. 8, the different characteristics of each mirror are represented generally in terms of overall circle size. It is understood and appreciated that these differences may be differences in radius of curvature, differences in diameter and combinations thereof.

To aid in clarity of understanding, side views of certain mirrors have been provided. For example, mirrors 800 and 802 are shown to be of substantially the same circle size, which in at least one embodiment is indicative of substantially the same diameter. However, the radius of curvature for each mirror is also illustrated and the radius of curvature for mirror 802 is much larger than the radius of curvature for mirror 800. Likewise mirrors 804 and 806 are shown to be of substantially the same size, yet each is also shown to have a different radius of curvature. Moreover, in at least one embodiment, at least two of the mirrors for the second subgroup 126 have different radius of curvature, and/or at least two mirrors for the second subgroup 126 have different diameters.

Also shown in FIG. 8 are two sky only mirrors, e.g., mirrors 808 and 810. As illustrated, each sky only mirror is structured and arranged to hide the reflection of the sun (such as with a non-reflection section 812 specifically oriented towards the sun) while reflecting the remaining sky that is illuminating the mirror surface. In the above discussion the issue of incident of skylight and its reflectance is considered in determining the actual point source illumination provided by a mirror to the input aperture of a sensor. Sky only mirrors 808, 810 provide an immediate reference value for the skylight from the SPARC 100 itself.

In addition, in at least one embodiment, at least one mirror is structured and arranged to provide point source targets consisting only of a solar image. Such point source target mirrors, such as mirror 814 are specifically sized to effectively provide the reflected image of the sun, but not the sky—as such mirror 814 is shown to be quite small.

It is also to be appreciated that for the embodiment illustrated by FIG. 8, each mirror of the second subgroup 126 is located upon the center 308 of a ground pixel 302. With respect to FIGS. 3 and 8, and the as yet to be discussed FIGS. 9-13, the mirrors underlying pixel centers 308 and grid lines 302, 304 and 310, 312 are clearly shown below each mirror so as to aid in understanding and appreciating the alignment of the mirrors 102 comprising SPARC 100.

Figure 9:
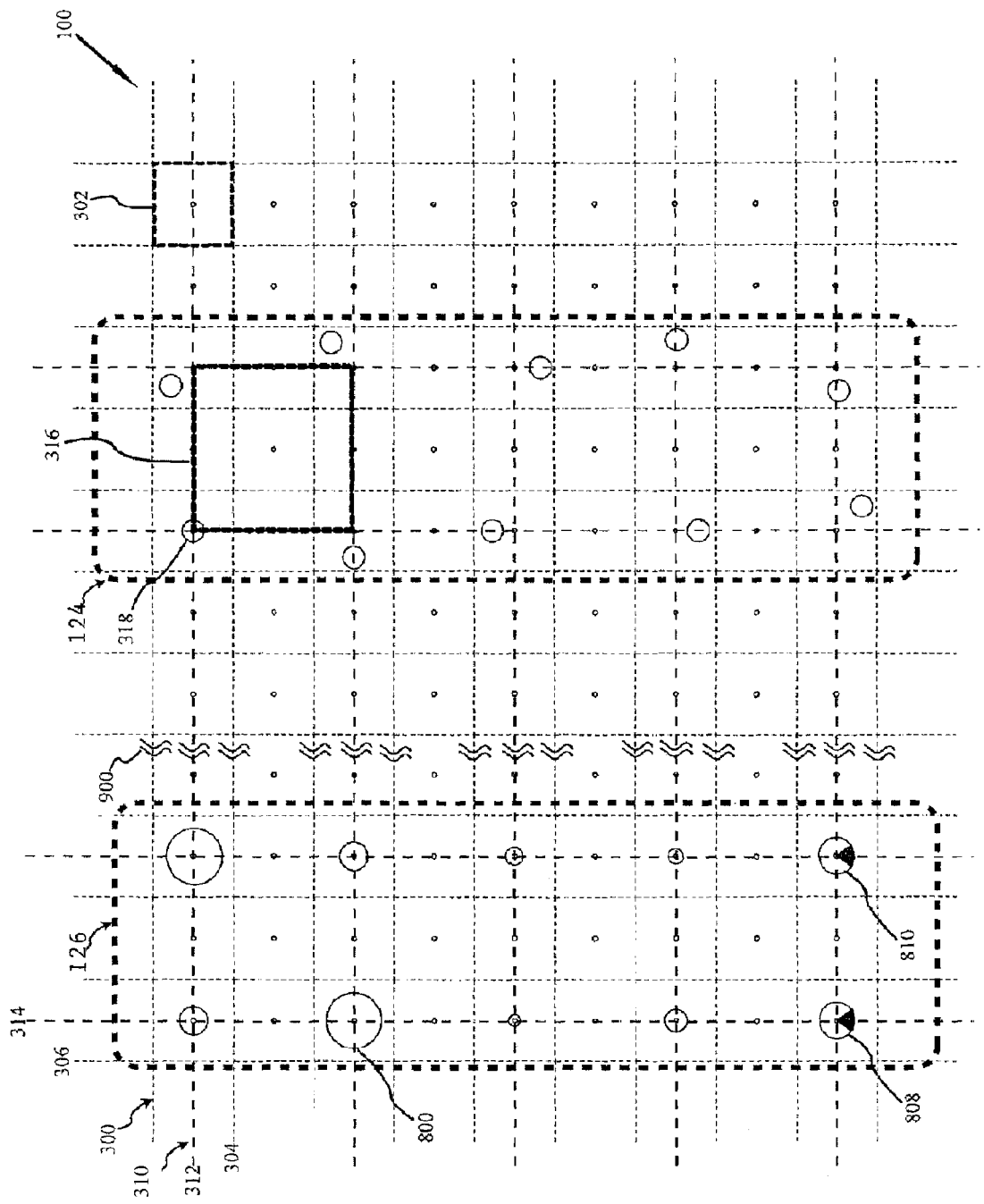
FIG. 9 is a top view conceptually illustrating the first subgroup of mirrors adjacent to the second subgroup of mirrors as shown in FIG. 1 in accordance with at least one embodiment.

FIG. 9 is a top view of SPARC 100 according to at lest one embodiment wherein the first subgroup 124 of mirrors is disposed adjacent to the second subgroup 126 of mirrors. As indicated by the squiggle lines 900, the number of empty ground pixels 302 between the adjacent first and second subgroups may be greater than as shown. In addition, although the first and second subgroups 124, 126 are shown as being aligned with respect to each other, for ease of illustration, it is understood and appreciated that in varying embodiments the first and second subgroups 124, 126 may or may not be aligned.

The embodiment of SPARC 100 suggested by FIG. 9 is in at least one embodiment advantageous as it provides separate sub-arrays, e.g., first and second subgroups 124, 126, each of which provides point source targets for base line calibration of an overflying sensor. More specifically, the first subgroup 124 providing the reference point source targets for the determination of any spatial phasing and the second subgroup 126 providing point source targets of varying intensity for dynamic range calibration.

Figure 10:
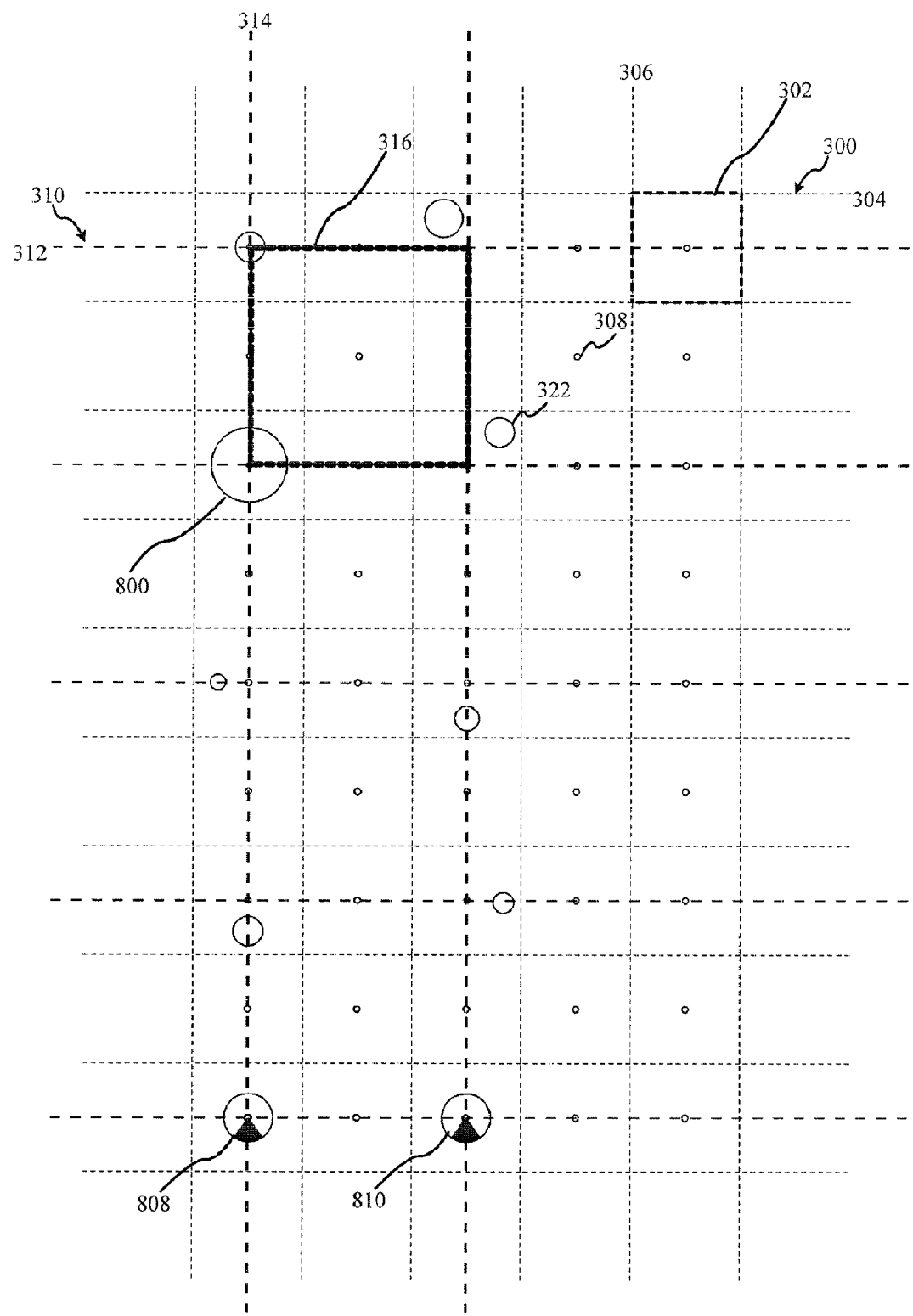
FIG. 10 is a top view conceptually illustrating the first and second subgroups of mirrors combined as the same array in accordance with at least one embodiment.

In at least one alternative embodiment, as suggested by FIG. 10, the characteristics of the first and second subgroups are combined as the same array, arranged systematically on the cross point grid array 310. Moreover, as shown the mirrors 102 in the embodiment for SPARC 100 suggested by FIG. 10 vary in size, radius of curvature, and placement offset from the cross points of grid array 310. Indeed, mirror 800 corresponds to mirror 800 as shown in FIG. 8, and mirror 322 corresponds to mirror 322 as shown in FIG. 3. In this combined form, such an embodiment may have advantages in providing calibration targets for both spatial phasing and dynamic range calibration with a fewer number of mirrors.

Figure 11:
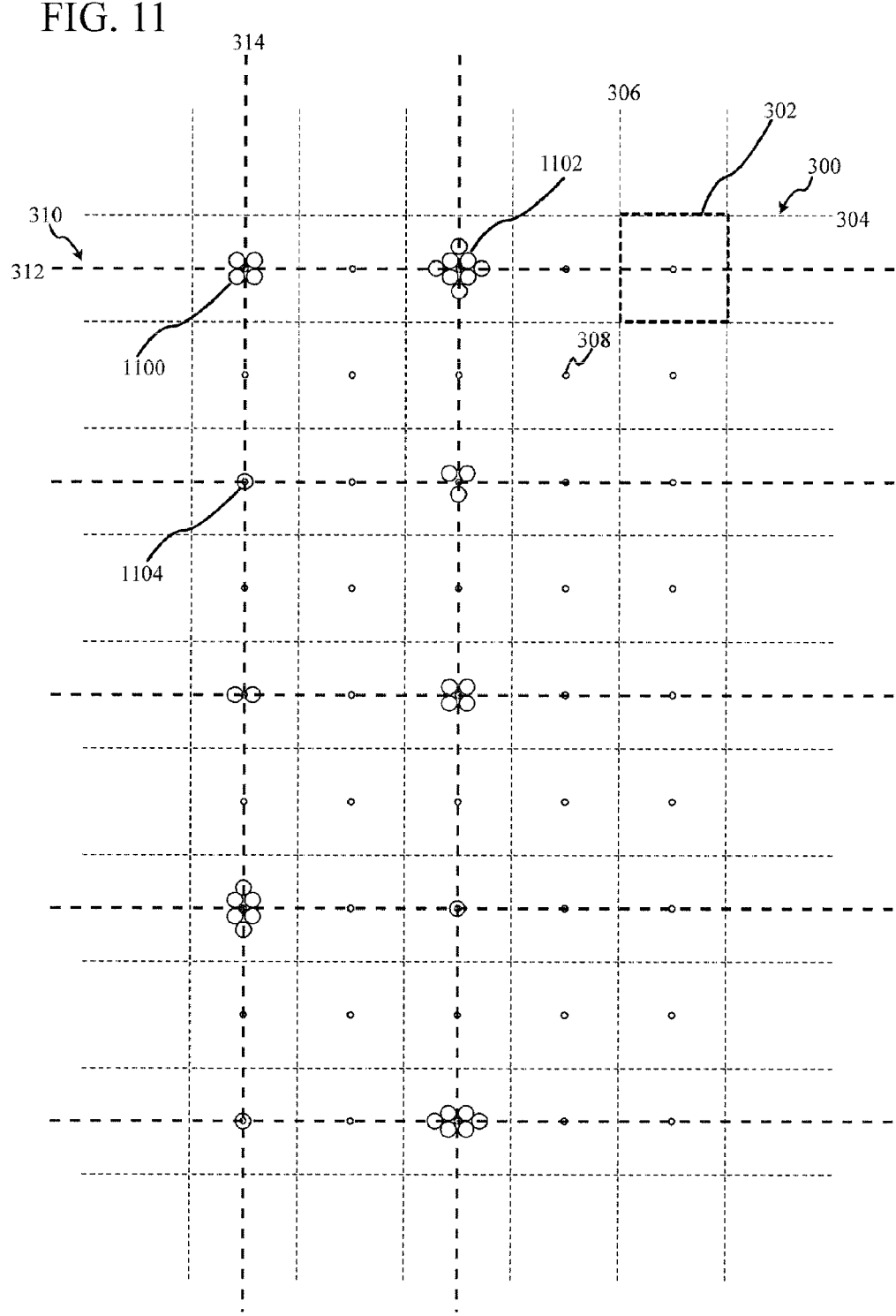
FIG. 11 is a top view conceptually illustrating an alternative arrangement for the second subgroup of mirrors in accordance with at least one embodiment.

In FIG. 11, an alternative embodiment of the second subgroup 126 is shown wherein the mirrors 102 are substantially identical and subdivided into subsets of one or more collective mirrors as quasi point sources—e g, two or more mirrors collectively operate and combine as a point source. For example quasi point source 1100 is provided by four mirrors 102, quasi point source 1102 is provided by eight mirrors 102, and quasi point source 1104 is in actuality a true point source as it is just one mirror.

As the mirrors are substantially identical, it is appreciated that the intensity provided by each quasi point source is a factor dependent upon the number of mirrors grouped together. In at least one embodiment, for ease of deployment and/or alignment, the subsets of one or more mirrors are disposed upon panels.

Figure 12:
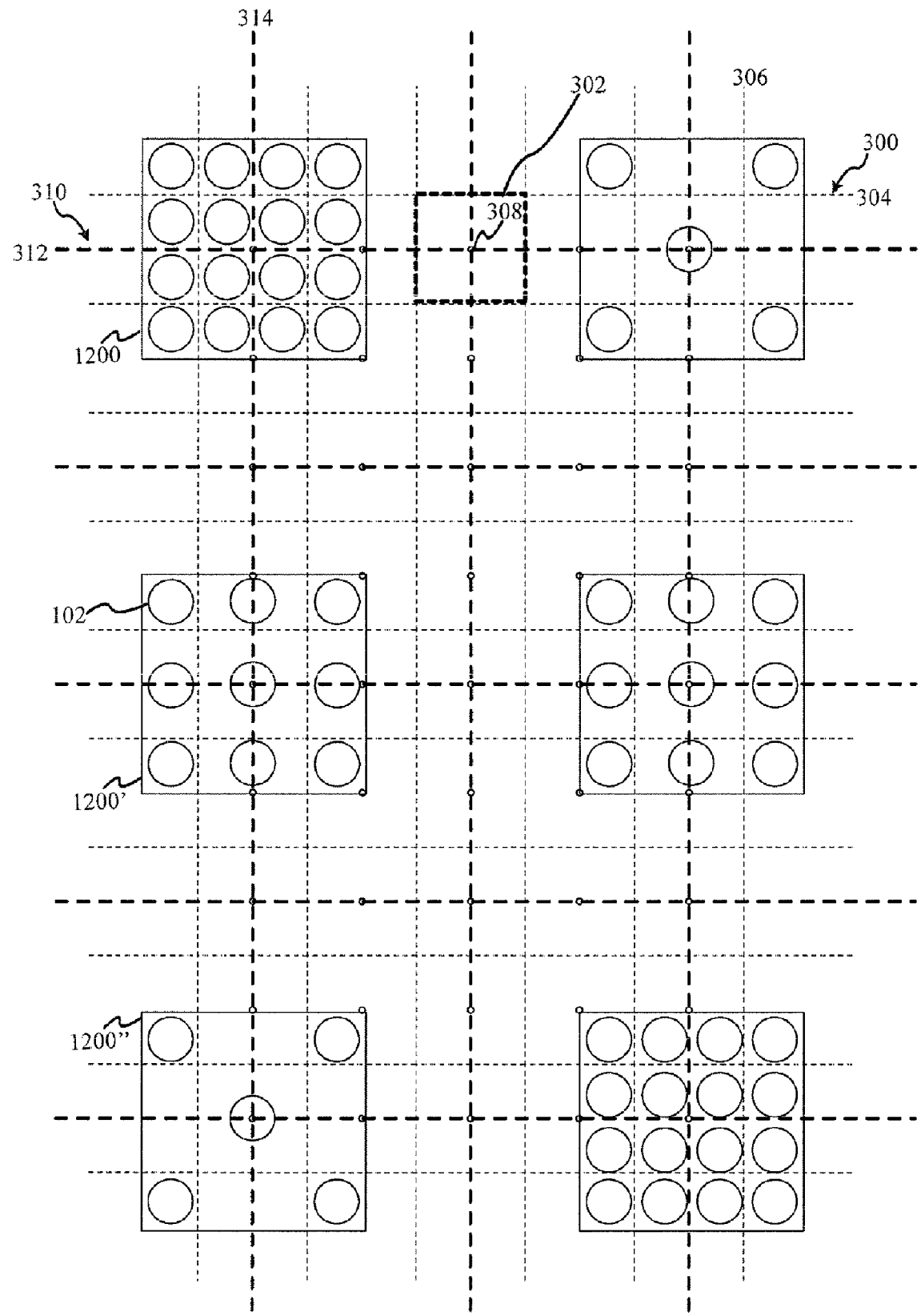
FIG. 12 is a top view conceptually illustrating an alternative arrangement for the second subgroup of mirrors disposed upon panels of substantially the same size, the number of mirrors varying between panels in accordance with at least one embodiment.
Figure 13:
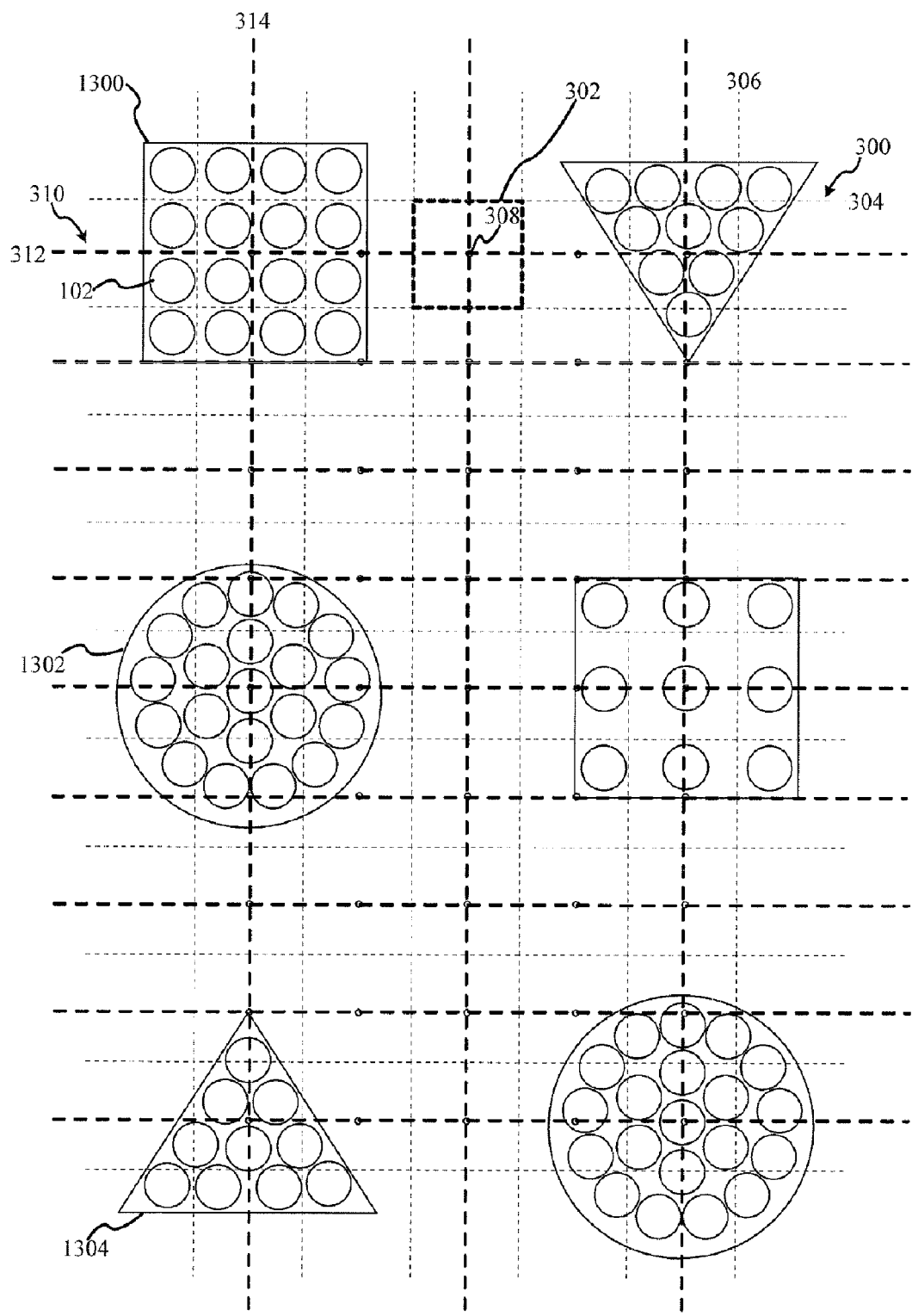
FIG. 13 is a top view conceptually illustrating an alternative arrangement for the second subgroup of mirrors disposed upon panels of different geometric shapes in accordance with at least one embodiment.

FIGS. 12 and 13 provide yet other alternative embodiments for the configuration of second subgroup 126. In FIG. 12 the spherical mirrors 102 are again substantially identical and grouped together in subsets upon panels 1220. In this embodiment, the panels 1220 are substantially the same size and, in at least one embodiment are larger than each individual pixel 302. These panels 1220 have the same average spatial properties but the integrated intensity provided by each panel varies.

For example, as illustrated, panel 1200 has sixteen mirrors, whereas panel 1200' has nine mirrors, and panel 1200" has five mirrors. The decreasing number of mirrors on panels 1200' and 1200" has a resulting effect that each provides less integrated intensity then does panel 1200.

In FIG. 13 the geometric shape of the panels varies. Panel 1300 is shown to be generally square, panel 1302 is shown to be generally round and panel 1304 is shown to be triangular. As in FIG. 12, in at least one embodiment the spherical mirrors 102 are substantially identical.

As noted above, the overflying sensors do not see the individual mirrors, even with a large array. Rather, the reflective targets provided by the mirrors fuzz and blur over 4 to 6 adjacent pixels even though each mirror is smaller than a pixel. However, the geometric shape of the panels 1300 and more specifically the arrangement of the mirrors thereon provides specific target blobs that advantageously permit the sensor to be calibrated for ground truth in response to how the sensor perceives the shape.

It should be understood and appreciated that although not shown, identical panels, as shown in FIG. 12, the arrangement of the mirrors upon the panels providing the different geometric target blobs. Further, in at least one embodiment, the arrays as shown in FIGS. 12 and 13 may be disposed in a SPARC 100 embodiment in addition to the first and second subgroups 124, 126 as shown in FIG. 9.

Figure 14:
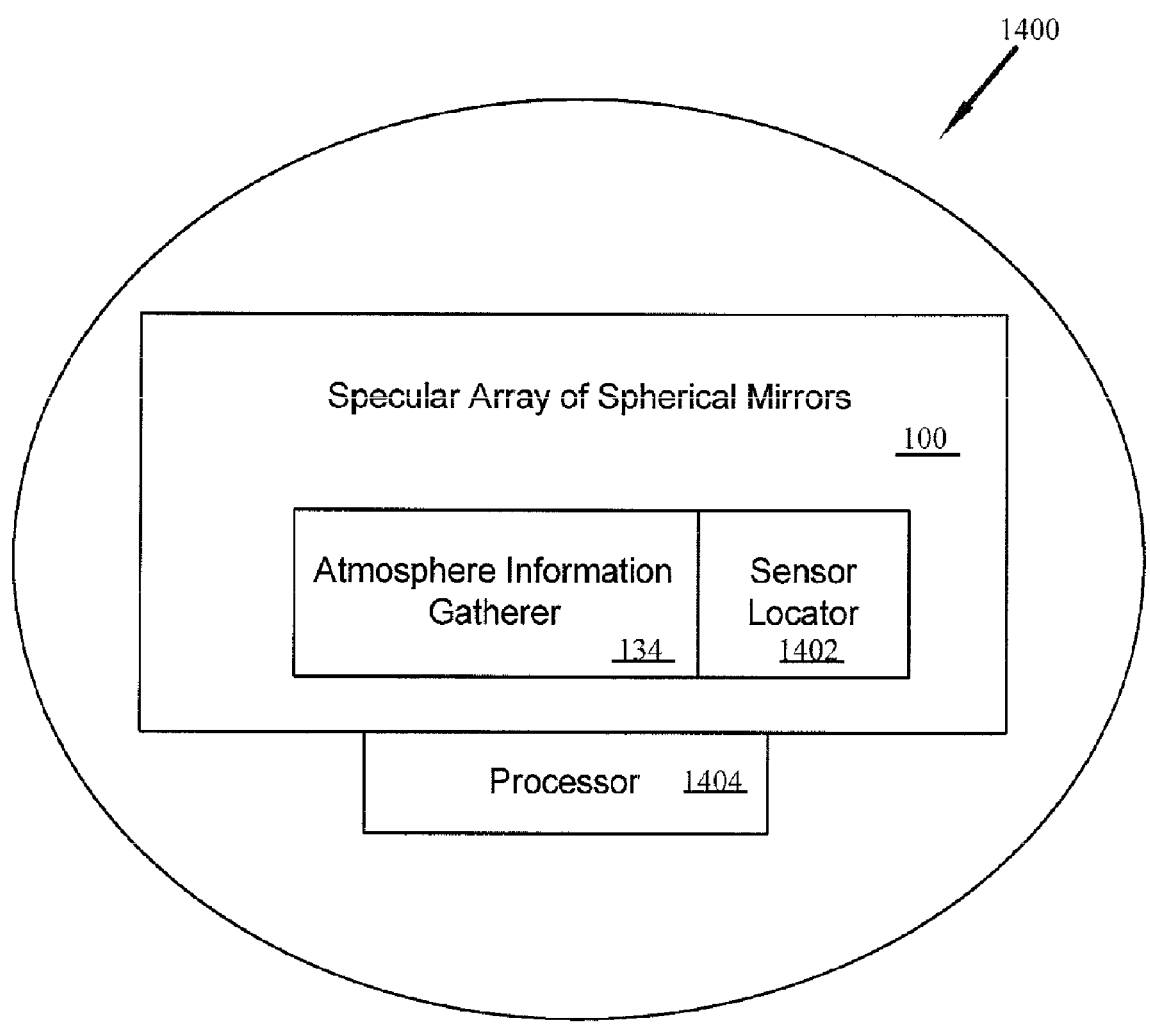
FIG. 14 presents a block diagram conceptually illustrating the elements of a specular array radiometric calibration system in accordance with at least one embodiment.

With respect to the above discussion, FIG. 14 provides a high level block diagram of the system architecture for a system 1400 for radiometric calibration incorporating SPARC 100, in accordance with at least one embodiment. The system 1400 includes, SPARC 100—and specifically an array of spherical mirrors disposed upon a uniform background—in accordance with at least one of the above described embodiments, at least one atmospheric information gatherer 134, a sensor locator 1402 and a processor 1404.

As also noted above, in at least one preferred embodiment, the sensor location information is provided by the sensor itself, the sensor locator 1402 operating to extract this information rather than truly determine location by observation. Moreover, the location sensor 1402 is a transceiver or operable component coupled to a transceiver, the component operating to extract the location information from data transmitted by the sensor.

In addition, the processor 1404 that determines the intensity and irradiance provided to the input aperture of a sensor to be calibrated in accordance with Equations 9 and 10 is in one embodiment an incorporated element of information gatherer 134. In at least one alternative embodiment, the processor 1404 is incorporated as a part of the sensor assembly, and/or transport vehicle operating the sensor.

Figure 15:
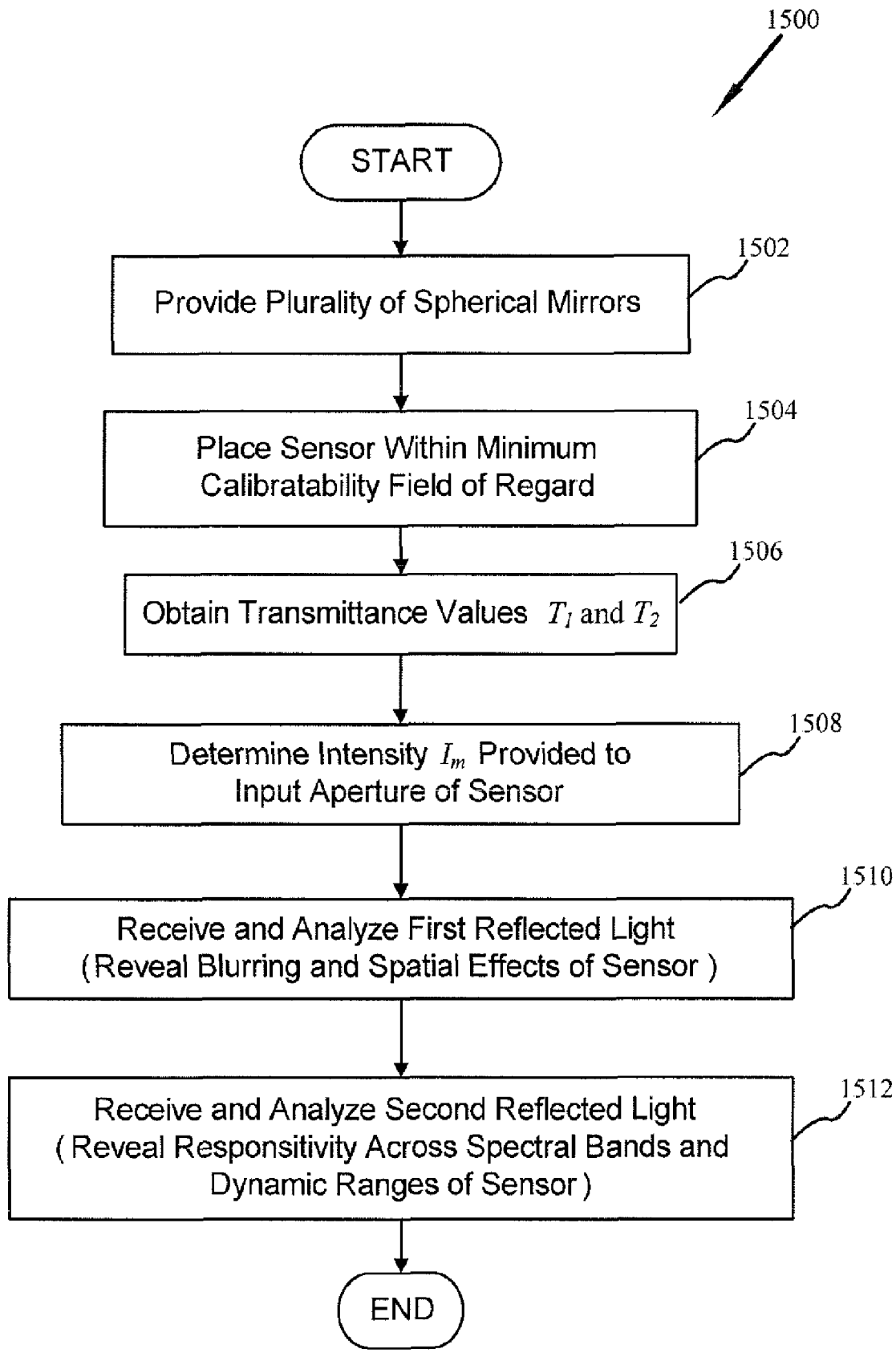
FIG. 15 presents a flow diagram for a method of calibration in accordance with at least one embodiment.

Having discussed the structural configurations of SPARC 100 and a calibration system incorporating SPARC 100, a method of radiometric calibration as performed with SPARC 100 in accordance with at least one embodiment is illustrated in the flow diagram of FIG. 15. It is understood and appreciated that the method need not be performed in the order herein described, but rather the order is presented for ease of discussion and illustration in accordance with at least one embodiment.

Moreover as shown, the method 1500 generally commences with providing SPARC 100 in at least one of the structural arrangements as discussed above, block 1502 For actual calibration, the sensor to be calibrated is then placed within the collective minimum calibratory field of regard, block 1504. This placement of the sensor may be achieved by actively directing the sensor to pass within the collective minimum calibratory field of regard or by orienting SPARC 100 so as to provide the collective minimum calibratory field of regard in an orientation so as to intersect the overhead flight path of the sensor.

The method 1500 continues with obtaining the transmittance value for the atmospheric path from the sun to a mirror ($T_1$) and from a mirror to the sensor ($T_2$) to be calibrated, block 1506. The intensity ($I_m$) of the reflected directly incident sunlight provided by each mirror to the input aperture of the sensor to be calibrated is then determined, block 1508. In at least one embodiment, this determination of provided intensity is made in accordance with Equation 9 as discussed above.

Two advantageous calibration operations are permitted for the sensor based on SPARC 100. In the first case, the sensor receives and analyzes first reflected sunlight from the mirrors, e.g., the first subgroup 124, to reveal burring and spatial effects of the sensor, block 1510. In the second case, the sensor receives and analyzes second reflected sunlight from the mirrors, e.g., the second subgroup 126. This second reflected sunlight is compared with the determined intensity to provide data revealing responsitivity of the sensor across all spectral bands and dynamic ranges, block 1512

It is of course understood and appreciated that additional elements of calibration may be performed as well, such as for example an on-board black body calibration of the sensor flooding the detectors with a uniform radiance or a bias calibration (wherein the sensor is activated with a shield or other device to prevent the reception of any light) so as to achieve a baseline of the sensor with no received light.

It is further understood and appreciated that multiple sensors may be undergoing substantially simultaneous calibration by virtue of them being within the collective minimum calibratory field of regard. Moreover, SPARC 100 provides an effective and advantageous way to provide precisely known intensity values for reflected calibration targets that may be used for baseline calibration reference with respect to blurring effects, spatial effects, dynamic range performance, ground truth and combinations thereof—each of which is provided independently from the type of sensor to be calibrated.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A specular array for radiometric calibration, comprising:
a plurality of spherical mirrors disposed upon a uniform background as at least one array of reflective points, at least two points reflecting a different intensity of directly incident sunlight,
each mirror having a radius of curvature and a diameter, the radius of curvature and the diameter providing a field of regard,
the collective mirrors providing a collective minimum calibratability field of regard,
wherein the plurality of spherical mirrors are subgrouped into a first subgroup of mirrors arranged systematically on a cross point grid array, at least one mirror disposed at a cross point of the grid array, the remaining plurality of mirrors individually offset at a predetermined location from the cross points of the grid array; and
a second subgroup of mirrors structured and arranged as an array of reflective points, at least two points reflecting a different intensity of directly incident sunlight.

2. A specular array for radiometric calibration, comprising:
a plurality of spherical mirrors disposed upon a uniform background, each mirror having a radius of curvature and a diameter;
a first subgroup of mirrors arranged systematically on a cross point grid array, at least one mirror disposed at a cross point of the grid array, the remaining plurality mirrors individually offset at a predetermined location from the cross points of the grid array; and a second subgroup of mirrors structured and arranged as an array of reflective points, at least two points reflecting a different intensity of directly incident sunlight; wherein for each mirror, the radius of curvature and the diameter providing a field of regard, the collective mirrors providing a collective minimum calibratability field of regard.

3. The specular array of claim 2, wherein for the first subgroup, the mirrors are essentially identical.

4. The specular array of claim 2, wherein for the second subgroup of mirrors, at least two mirrors of the subgroup have different radii of curvature.

5. The specular array of claim 2, wherein for the second subgroup of mirrors, at least two mirrors of the subgroup have different diameters.

6. The specular array of claim 2, wherein for the second subgroup of mirrors, the mirrors are identical and subdivided into subsets of one or more collective mirrors as quasi point sources for each reflective point of the array.

7. The specular array of claim 2, wherein the first subgroup and the second subgroup are adjacent arrays.

8. The specular array of claim 2, wherein the first subgroup and the second subgroup are combined as the same array arranged systematically on the cross point grid array.

9. The specular array of claim 2, wherein at least a subgroup of spherical mirrors are structured and arranged to provide point source targets consisting of only a solar image provided by the directly incident sunlight.

10. The specular array of claim 2, further including at least one sky only mirror, structured and arranged to hide reflection of the sun while reflecting about the remaining sky illuminating the mirror surface, the sky only mirror providing a target that isolates the sky contribution from reflected intensity provided by the second subgroup of mirrors.

11. The specular array of claim 2, wherein the second subgroup of mirrors are identical mirrors disposed upon separate panels, each panel larger than the ground sample pixel resolution.

12. The specular array of claim 11, wherein the panels are about identical, the number of mirrors disposed upon at least one first panel different from the number of mirrors disposed upon at least one second panel.

13. The specular array of claim 11, wherein at least one first panel has a first geometric shape and at least one second panel has a second geometric shape different from the first geometric shape.

14. The specular array of claim 2, wherein the collective minimum calibratability field of regard dictates the above ground placement of a sensor to be calibrated.

15. The specular array of claim 2, wherein the specular array is structured and arranged to orient the collective minimum calibratability field of regard toward a sensor to be calibrated.

16. The specular array of claim 2, further including an actuator structured and arranged to actuate the specular array and dynamically orient the collective minimum calibratability field of regard toward a sensor to be calibrated.

17. The specular array of claim 2, further including at least one information gatherer structured and arranged to gather atmospheric information.

18. The specular array of claim 17, wherein the information gatherer is a solar radiometer operable to determine transmittance of the atmosphere.

19. The specular array of claim 17, further comprising:
a sensor locator structured and arranged to determine the location of a sensor to be calibrated including a distance H between each mirror and the sensor; and
a processor operable to receive the radius of curvature and reflectance for each mirror in the specular array and a transmittance value for an atmospheric path from the sun to a mirror ($T_1$) and from a mirror to the sensor ($T_2$) to be calibrated,
the processor operable to determine the intensity ($I_m$) of the reflected directly incident sunlight provided by each mirror at an input aperture of the sensor to be calibrated.

20. A system for radiometric calibration, comprising:
a specular array structured and arranged to provide a collective minimum calibratability field of regard of direct reflective sunlight, the specular array comprising:
a plurality of spherical mirrors disposed upon a uniform background as at least one array of reflective points, at least two points reflecting a different intensity of directly incident sunlight,
each mirror having a radius of curvature, a diameter and a reflectance, the radius of curvature and the diameter providing a field of regard, the collective mirrors providing the collective minimum calibratability field of regard;
an atmosphere information gatherer operable to obtain at least one transmittance value of the atmosphere adjacent to the specular array;

a sensor locator operable to determine the location of a sensor to be calibrated including a distance H between each mirror and the sensor; and a processor operable to receive the radius of curvature and reflectance for each mirror in the specular array and the transmittance value for an atmospheric path from the sun to a mirror ($T_1$) and from a mirror to the sensor ($T_2$) to be calibrated, the processor operable to determine the intensity ($I_m$) of the reflected directly incident sunlight provided by each mirror at an input aperture of the sensor to be calibrated.

21. The system for radiometric calibration of claim 20, wherein the plurality of spherical mirrors are subgrouped;
a first subgroup of mirrors arranged systematically on a cross point grid array,
at least one mirror disposed at a cross point of the grid array, the remaining plurality mirrors individually offset at a predetermined location from the cross points of the grid array; and
a second subgroup of mirrors structured and arranged as an array of reflective points, at least two points reflecting a different intensity of directly incident sunlight.

22. The system for radiometric calibration of claim 21, wherein for the first subgroup, the mirrors are essentially identical.

23. The system for radiometric calibration of claim 21, wherein for the second subgroup of mirrors, at least two mirrors of the subgroup have different radii of curvature.

24. The system for radiometric calibration of claim 21, wherein for the second subgroup of mirrors, at least two mirrors of the subgroup have different diameters.

25. The system for radiometric calibration of claim 21, wherein for the second subgroup of mirrors, the mirrors are identical and subdivided into subsets of one or more collective mirrors as quasi point sources for each reflective point of the array.

26. The system for radiometric calibration of claim 21, wherein the first subgroup and the second subgroup are adjacent arrays.

27. The system for radiometric calibration of claim 21, wherein the first subgroup and the second subgroup are a combined as the same array arranged systematically on the cross point grid array.

28. The system for radiometric calibration of claim 20, wherein the intensity $I_m$ is determined by computing:

$$I(\lambda)_m = \frac{r(\lambda)E_o(\lambda)R^2 T_1(\lambda)T_2(\lambda)}{4}\left(1 + \frac{fG(\lambda)}{1 - G(\lambda)}\right) \text{watts}/str,$$

wherein $r(\lambda)$ is mirror specular reflectance, R is the mirror radius of curvature, $E_0(\lambda)$ is top-of-atmosphere solar irradiance, and $G(\lambda)$ is an estimation of sky contribution as a fraction of the reflected directly incident sunlight, providing a diffuse-to-global ratio.

29. The system for radiometric calibration of claim 28, wherein the processor is further operable to determine irradiance at the sensor ($E_{at\text{-}sensor}$) by computing:

$$E_{at\text{-}sensor}(\lambda) = \frac{r(\lambda)E_o(\lambda)R^2 T_1(\lambda)T_2(\lambda)}{4H^2}\left(1 + \frac{fG(\lambda)}{1 - G(\lambda)}\right) \text{watt/m}^2 \text{ }str.$$

30. A method for radiometric calibration, comprising:
providing a plurality of spherical mirrors disposed upon a uniform background, each mirror having a radius of curvature and a diameter, the mirrors arranged as:

a first subgroup of mirrors arranged systematically on a cross point grid array, at least one mirror disposed at a cross point of the grid array, the remaining plurality mirrors individually offset at a predetermined location from the cross points of the grid array; and a second subgroup of mirrors structured and arranged as an array of reflective points, at least two points reflecting a different intensity of directly incident sunlight;

wherein for each mirror, the radius of curvature and the diameter providing a field of regard, the collective mirrors providing a collective minimum calibratability field of regard;

placing a sensor to be calibrated within the collective minimum calibratability field of regard;

obtaining a transmittance value for an atmospheric path from the sun to a mirror ($T_1$) and from a mirror to the sensor ($T_2$) to be calibrated;

determining the intensity ($I_m$) of the reflected directly incident sunlight provided by each mirror to an input aperture of the sensor to be calibrated;

receiving and analyzing first reflected sunlight from the first subset of mirrors, the first reflected sunlight providing data revealing blurring and spatial effects of the sensor; receiving and analyzing second reflected sunlight from the second subset of mirrors, the second reflected sunlight compared with the determined intensity to prove data revealing responsitivity of the sensor across about all spectral bands and dynamic ranges.

31. The method for radiometric calibration of claim 30, wherein for the first subgroup, the mirrors are essentially identical.

32. The method for radiometric calibration of claim 30, wherein for the second subgroup of mirrors, at least two mirrors of the subgroup have different radius of curvature.

33. The method for radiometric calibration of claim 30, wherein for the second subgroup of mirrors, at least two mirrors of the subgroup have different diameters.

34. The method for radiometric calibration of claim 30, wherein for the second subgroup of mirrors, the mirrors are identical and subdivided into subsets of one or more collective mirrors as quasi point sources for each reflective point of the array.

35. The method for radiometric calibration of claim 30, wherein the first subgroup and the second subgroup are adjacent arrays.

36. The method for radiometric calibration of claim 30, wherein the first subgroup and the second subgroup are a combined as the same array arranged systematically on the cross point grid array.

37. The method for radiometric calibration of claim 30, wherein the intensity $I_m$ is determined by computing:

$$I(\lambda)_m = \frac{r(\lambda)E_o(\lambda)R^2 T_1(\lambda)T_2(\lambda)}{4}\left(1 + \frac{fG(\lambda)}{1 - G(\lambda)}\right) \text{watt}/str,$$

wherein $r(\lambda)$ is mirror specular reflectance, R is the mirror radius of curvature, $E_0(\lambda)$ is top-of-atmosphere solar irradiance, and $G(\lambda)$ is an estimation of sky contribution as a fraction of the reflected directly incident sunlight, providing a diffuse-to-global ratio.

\* \* \* \* \*